US008462262B2

(12) United States Patent
Yang et al.

(10) Patent No.: US 8,462,262 B2
(45) Date of Patent: Jun. 11, 2013

(54) PORTABLE TERMINAL HAVING A PROJECTION UNIT

(75) Inventors: Kyung-Tae Yang, Gyeonggi-Do (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 12/495,751

(22) Filed: Jun. 30, 2009

(65) Prior Publication Data
US 2010/0026818 A1 Feb. 4, 2010

(30) Foreign Application Priority Data
Aug. 4, 2008 (KR) .................. 10-2008-0076184

(51) Int. Cl.
*H04N 5/225* (2006.01)

(52) U.S. Cl.
USPC ...................................... 348/373; 348/333.1

(58) Field of Classification Search
USPC ............................ 348/14.04, 373–376, 333.1
See application file for complete search history.

(56) References Cited

U.S. PATENT DOCUMENTS

| 7,400,916 | B2 * | 7/2008 | Lee et al. ...................... 348/374 |
| 2006/0234784 | A1 * | 10/2006 | Reinhorn ................... 455/575.1 |
| 2007/0265717 | A1 * | 11/2007 | Chang ............................. 700/83 |
| 2008/0176605 | A1 * | 7/2008 | Choi et al. ................... 455/566 |
| 2008/0311963 | A1 * | 12/2008 | Strawn ....................... 455/575.1 |
| 2009/0027570 | A1 * | 1/2009 | Fujinawa ...................... 348/744 |
| 2009/0033877 | A1 * | 2/2009 | Choi et al. ....................... 353/36 |
| 2009/0033880 | A1 * | 2/2009 | Heo et al. ......................... 353/52 |
| 2011/0085092 | A1 * | 4/2011 | Yun et al. ...................... 348/744 |

FOREIGN PATENT DOCUMENTS

| GB | 2426653 | 11/2006 |
| JP | 2002305567 | 10/2002 |
| JP | 2007271913 | 10/2007 |

* cited by examiner

*Primary Examiner* — Gevell Selby
(74) *Attorney, Agent, or Firm* — Lee, Hong, Degerman, Kang & Waimey

(57) ABSTRACT

A terminal includes a display, a body comprising a front side, a rear side, a left side, and a right side, wherein the body is sized to receive the display, the display being positioned to be viewable from the front side of the body, and a projector mounting portion located at an end of the body, the projector mounting portion comprising a front side, a rear side, a left side, and a right side. The terminal also includes a housing sized to slidably receive the projector mounting portion, wherein the housing is positionable between open and closed positions by providing relative linear motion between the housing and the body, wherein the open position relates to increasing the relative distance between the housing and the display, and the closed position relates to decreasing the relative distance between the housing and the display. The terminal also has a projector located within the projector mounting portion and is operable to project an image on an external surface when the housing is at least partially positioned in the open position, wherein the projector is located to project the image from one of the left or right sides of the projector mounting portion.

21 Claims, 10 Drawing Sheets

PORTABLE TERMINAL HAVING A PROJECTION UNIT

CROSS-REFERENCE TO RELATED APPLICATIONS

Pursuant to 35 U.S.C. §119(a), this application claims the benefit of earlier filing date and right of priority to Korean Application No. 10-2008-0076184, filed on Aug. 4, 2008, the contents of which are hereby incorporated by reference herein in their entirety

FIELD OF THE INVENTION

The present invention relates generally to a portable terminal, and in particular, to a portable terminal having a projector configured to outwardly project an image.

DISCUSSION OF THE RELATED ART

In general, a portable terminal is a device that can be carried around and has one or more functions such as to perform voice and video call communications, inputting and outputting information, storing data, and the like. As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

Various attempts have been made to implement complicated functions in such a multimedia device by means of hardware or software. For instance, a user interface environment is provided in a portable terminal to enable a user to easily and conveniently search for or select a desired function among available functions. As the portable terminal is regarded as a personal item to express a user's personality, various designs have been required. Additionally, methods for enlarging a size of an image implemented by the portable terminal have been proposed.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a terminal include a display; a body comprising a front side, a rear side, a left side, and a right side, wherein the body is sized to receive the display, the display being positioned to be viewable from the front side of the body; and a projector mounting portion located at an end of the body, the projector mounting portion comprising a front side, a rear side, a left side, and a right side. The terminal also includes a housing sized to slidably receive the projector mounting portion, wherein the housing is positionable between open and closed positions by providing relative linear motion between the housing and the body, wherein the open position relates to increasing the relative distance between the housing and the display, and the closed position relates to decreasing the relative distance between the housing and the display, and a projector located within the projector mounting portion and being operable to project an image on an external surface when the housing is at least partially positioned in the open position, wherein the projector is located to project the image from one of the left or right sides of the projector mounting portion.

In accordance with another embodiment, a terminal includes a display; a body comprising a front side, a rear side, a left side, and a right side, wherein the body is sized to receive the display, the display being positioned to be viewable from the front side of the body; and a projector mounting portion fixedly coupled to the body, the projector mounting portion comprising a front side, a rear side, a left side, and a right side, wherein the projector mounting portion further comprises a first width along the front and rear sides and a first height along the left and right sides, and the body further comprises a second width along the front and rear sides and a second height along the left and right sides, wherein the first width is smaller than the second width and the first height is smaller than the second height. The terminal also includes a housing sized to define a cavity to slidably receive the projector mounting portion, wherein the housing is positionable between open and closed positions by providing relative linear motion between the housing and the body, wherein the open position relates to increasing the relative distance between the housing and the display, and the closed position relates to decreasing the relative distance between the housing and the display; and a projector located within the projector mounting portion and being operable to project an image on an external surface when the housing is at least partially positioned in the open position, wherein the projector is located to project the image from one of the left or right sides of the projector mounting portion, wherein the housing is positionable along a first axis and the projector is configured to project the image along a second axis which is substantially perpendicular to the first axis. If desired, the projector mounting portion is structured to define a plurality of apertures located proximate to the projector, each of the plurality of apertures being sized to permit air flow into an interior region of the projector mounting portion to facilitate cooling during operation of the projector, and the projector and the plurality of apertures are protectively covered by the housing when the housing is in the closed position.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
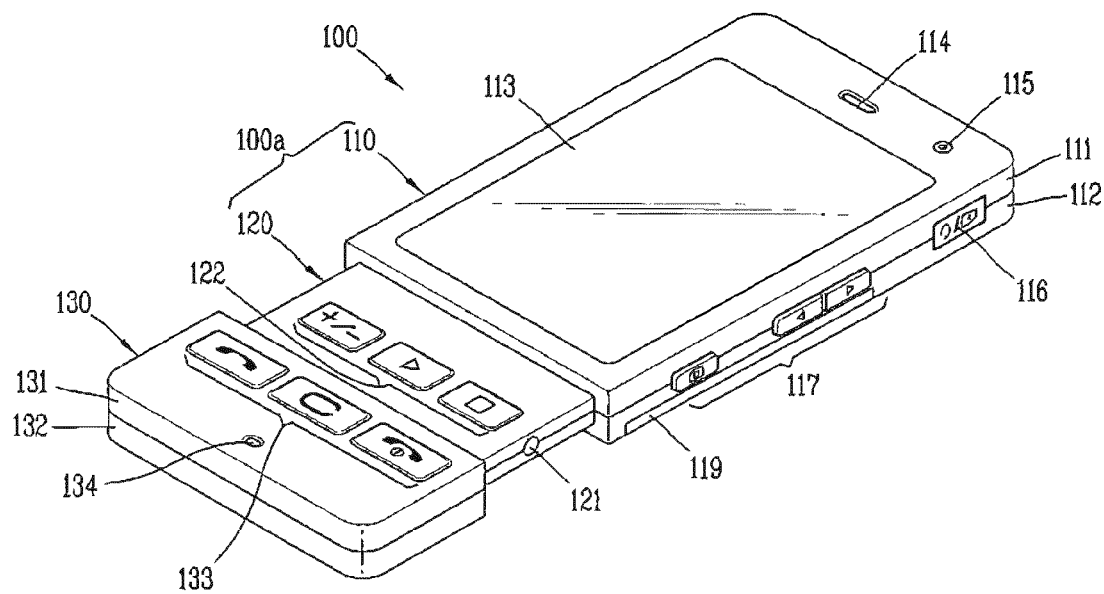
FIG. 1 is a perspective view of a portable terminal according to one embodiment of the present invention in an open state.

Referring to FIG. 1, a portable terminal 100 is implemented as a bar-type terminal body and includes terminal body 100a (hereinafter, will be referred to as 'terminal body'). However, the disclosed embodiments are not limited to such a bar-type body and such teachings may be applied to various other types such as a slide-type, a folder-type, a swing-type, or a swivel-type portable terminal.

The appearance of the portable terminal 100 is formed by a front case 111 and a rear case 112. Various electronic components are mounted within a space formed by the front case 111 and the rear case 112. One or more intermediate cases may be provided between the front case 111 and the rear case 112.

The front and rear cases 111 and 112 may be made of a polymeric material, such as being formed by injection-molding synthetic resin, formed using metallic material, such as stainless steel (CRES) or titanium (Ti), or made of other materials that are known in the art.

A display unit 113, a first audio output unit 114, or a first image input unit 115 may be disposed on the front case 111. The display unit 113 may be implemented as a Liquid Crystal Display (LCD) module, an Organic Light Emitting Diodes (OLED) module, or another display device known in the art. The display unit 113 may also be configured as a touch screen including a touch pad for allowing information to be input by a user's touch.

The first audio output unit 114 may be implemented as a speaker or a receiver. The first image input unit 115 may be implemented as a camera module configured to capture a user's still images or moving images.

An interface unit 116 may be disposed on at least one of the front case 111 or the rear case 112. The interface unit 116 may be implemented to couple the portable terminal 100 with external devices. The interface unit 116 may be implemented as at least one of a wired/wireless connection port for connecting an earphone to the mobile terminal, a short-range communications port (e.g., an Infrared Data Association (IrDA) port, a Bluetooth port, a wireless LAN port, etc.), power supply ports for providing power to the mobile terminal, or another interface device known in the art. The interface unit 116 may be configured using a card socket (e.g., for coupling to a memory card, a subscriber identity module (SIM) card, a user identity module (UIM) card, etc.).

The terminal body 100a may be provided with an antenna portion for calls, Bluetooth communications, GPS communications, or other transmissions. A broadcast signal receiving antenna as well as the antenna portion may be disposed on at least one of the front case 111 or the rear case 112. The broadcast signal receiving antenna may be configured to retract into the terminal body 100a.

The terminal body 100a includes a first part 110, which includes the display unit 113, and a second part 120. The terminal body 100a is configured such that the first part 110 and the second part 120 are longitudinally aligned with ends of the first and second parts positioned adjacent each other.

Figure 3:
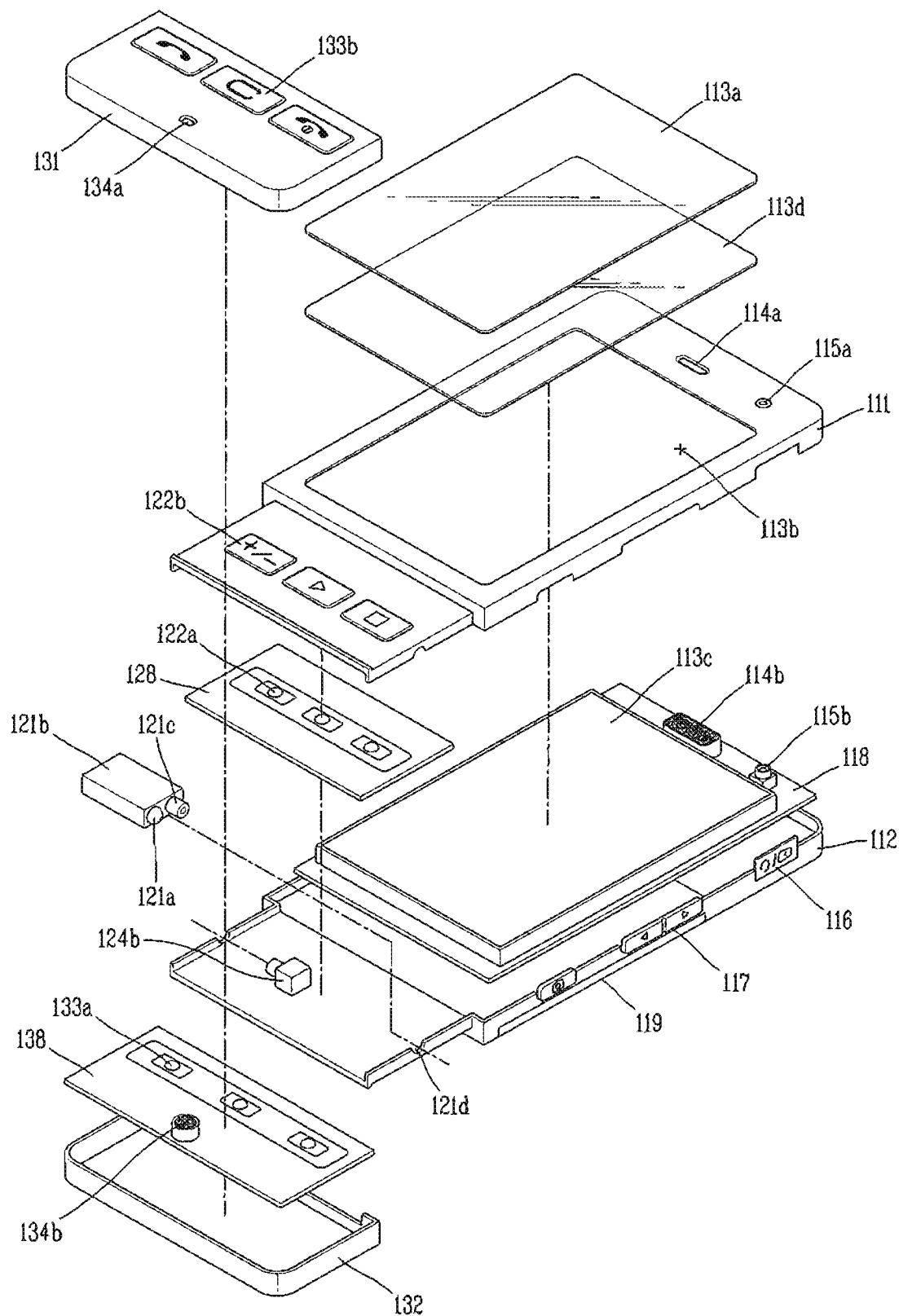
FIG. 3 is an exploded perspective view of the portable terminal of FIG. 1.

The display unit 113 displays first image information 401 (FIG. 9) on a window 113a (FIG. 3). The display unit 113 may occupy a majority of a first, top surface of the first part 110.

The second part 120 (also referred to herein as a projector mounting portion) may extend from the first part 110 in a stepped fashion with a periphery of the second part, at the junction of the first and second parts, being smaller than a periphery of the first part. A projection unit 121 (e.g., a projector) for outwardly projecting second image information 402 (FIG. 9) is provided at the second part 120. The projected second image information 402 is displayed in an enlarged format on an external surface. The external surface may include a screen for a beam projector, a wall surface, a bulletin board, or other device that may be utilized by a user to display the projected image. The external surface is configured to block or reflect light proceeding from the projection unit 121.

A projection manipulation unit 122 for performing manipulations relevant to the operation of the projection unit 121 (also referred to herein as a projector) is positioned at the second part. The manipulations relevant to the operation of the projection unit 121 may include starting/ending of the operation of the projection unit 121, focusing/zooming of the second image information 402, as well as other manipulations known in the art. The projection manipulation unit 122 may be arranged parallel to a surface in which the window 113a is disposed.

A cover 130 (also referred to herein as a housing) is coupled to the terminal body 100a in a movable relationship to permit relative motion between the cover and some or all of the terminal body. The cover 130 is formed so as to expose and cover the second part 120 by performing a relative motion, such as sliding over or away from portions of the second part 120. The appearance of the cover 130 is determined by a front cover portion 131 and a rear cover portion 132 of the cover 130.

A first user input unit 133 is positioned on the cover 130. The first user input unit 133 may be used to input information via manipulations. The first user input unit 133 may be arranged parallel to the surface on which the window 113a is disposed. The first user input unit 133 receives commands to control the operation of the portable terminal 100.

The first user input unit 133 and/or the projection manipulation unit 122 may be implemented as dome switches for receiving commands or information by a user's push, or may be implemented as a jog wheel or a joystick. The first user input unit 133 and/or the projection manipulation unit 122 may also be configured as a touch screen including a touch pad that allows information to be input by a user's touch. In this manner, the first user input unit 133 and/or the projection manipulation unit 122 may display various patterns that change in accordance to a user's touch. For instance, a screen of the first user input unit 133 or the projection manipulation unit 122 may be changed into various shapes such as an arrow and a check pattern according to motion of a user's finger.

The first user input unit 133 and/or the projection manipulation unit 122 may be configured to generate various tactile effects when being touched. The first user input unit 133 and/or the projection manipulation unit 122 may be implemented as a haptic module. A representative tactile effect generated by the haptic module includes vibration. The haptic module may be configured to interact not only with the first user input unit 133 or the projection manipulation unit 122, but also with the portable terminal.

A second user input unit 117 may be arranged on at least one of the front case 111 and the rear case 112, such as on the side of at least one of the front case and the rear case.

The first user input unit 133 may be used to input commands such as START, END, SCROLL, or other input commands known in the art, and the second user input unit 117 may serve as hot keys for performing specific functions such as activation of the first image input unit 115. The display unit 113 may be configured to display numbers, characters, symbols, or the like.

An audio input unit 134 for inputting a user's voice or various sounds may be disposed at the cover 130. The audio input unit 134 may be implemented as a microphone.

Figure 2:
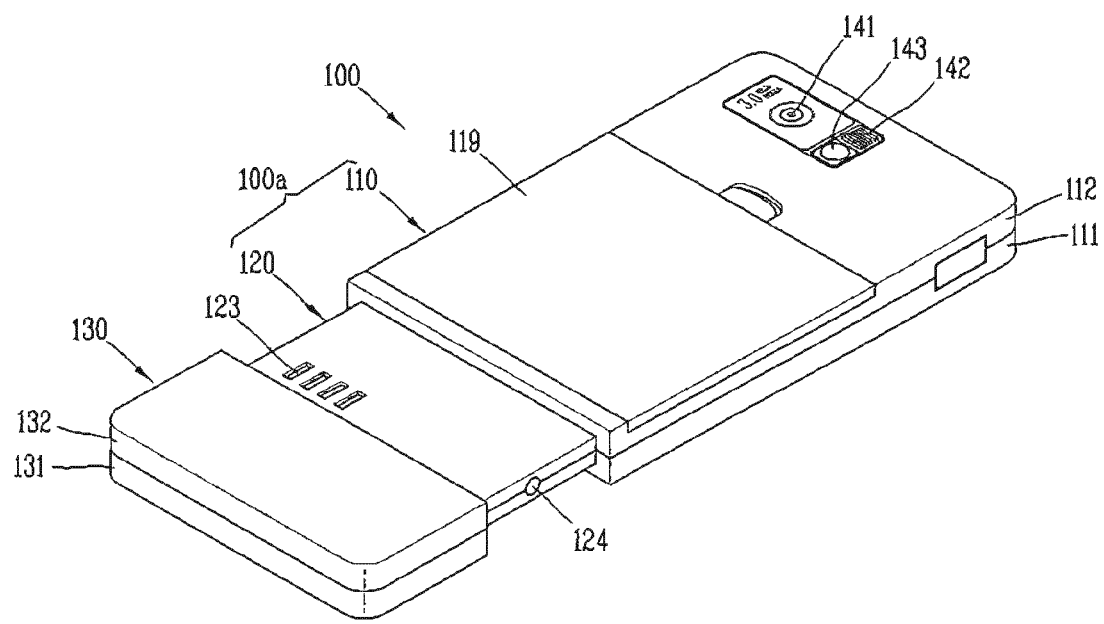
FIG. 2 is a perspective view of a rear surface of the portable terminal of FIG. 1.

Referring to FIG. 2, a second image input unit 141 may be mounted to a rear surface of the rear case 112. The second image input unit 141 faces a direction which is opposite to a direction faced by the first image input unit 115 (FIG. 1), and may have a pixel density that is the same or different from that of the first image input unit 115.

For example, the first image input unit 115 may operate with a relatively lower pixel density (lower resolution). Thus, the first image input unit 115 may be useful when a user can capture an image of their face and send it to a calling party in a video call mode or the like. On the other hand, the second image input unit 141 may operate with a relatively higher pixel density (higher resolution) such that it can be useful for a user to obtain higher quality pictures for later use.

A flash 142 and a mirror 143 may also be disposed adjacent to the second image input unit 141. When capturing an object by using the second image input unit 143, the flash 142 provides light to the object. The mirror 143 can cooperate with the second image unit 141 to allow a user to photograph himself or herself in a self-portrait mode.

A power supply unit 119 may be disposed at the rear case 112 to provide power to one or more components of the portable terminal 100. The power supply unit 119 may be a rechargeable battery, for example, that is attachable/detachable for charging.

The second part 120 may include ventilation holes 123 that communicate with the outside of the portable terminal 100 to emit heat produced by the projection unit 121. An advantage of this feature is that holes 123 may be protectively covered with the housing or second part 120 is in the closed position. Alternatively, or additionally, the ventilation holes 123 may be formed at the rear case 112. An optical source device 121a (FIG. 3) for emitting light is provided at the projection unit 121. The optical source device 121a emits light by converting electric energy into optical energy. While emitting light, the optical source device 121a has an increased temperature. As the temperature of the optical source device 121a increases, the brightness of light emitted from the optical source device 121a decreases. The ventilation holes 123 communicate between the inside and the outside of the second part 120, thereby lowering the temperature of peripheral air of the optical source device 121a. This increases the brightness of light emitted from the optical source device 121a. When the projection unit 121 is not in use, the through holes 123 disposed on the second part 120 are covered by the cover 130, thereby preventing foreign material from being introduced into the terminal body 100a.

A third image input unit 124 may also be disposed at the second part 120. The third image input unit 124 may be arranged in a direction opposite to a projection direction from the projection unit 121.

Referring to FIG. 3, an audio hole 114a and an image window 115a may be positioned on one surface of the front case 111 of the first part 110. The audio hole 114a and the image window 115a correspond to the first audio output unit 114 and the first image input unit 115 (FIG. 1), respectively. The image window 115a is made of a material capable of transmitting light.

The window 113a is coupled to one surface of the front case 111 of the first part 110. The window 113a is made of a material capable of transmitting light, e.g., a transmissive synthetic resin, reinforcing glass, etc. Alternatively, portions of the window 113a may be formed of a material that cannot transmit light, or which may be surface-processed such that light can not pass therethrough.

A window hole 113b is disposed at the front case 111 in correspondence to the window 113a. A display module 113c is disposed at the rear case 112 in correspondence to the window hole 113b, such that visual information output from the display module 113c can be recognized from outside. The window 113a may have an area corresponding to the display module 113c. A touch pad 113d for touch input may be mounted relative to one surface of the window 113a. The window 113a and the display module 113c form the display unit 113 (FIG. 1). The display unit 113 may be implemented as a touch screen including the touch pad 113d and configured for touch input.

A first circuit board 118, a speaker module 114b, a camera module 115b, and other components may be disposed at the rear case 112 of the first part 110. The first circuit board 118 may be configured as, for example, a controller 180 (FIG. 14) for operating the functions of the portable terminal 100. As shown, the display module 113c, the speaker module 114b, the camera module 115b, and other components may be mounted to the first circuit board 118.

The speaker module 114b may be disposed at the first circuit board 118 to align with the audio hole 114a, and the camera module 115b may be disposed at the first circuit board 118 to align with the image window 115a.

The camera module 124b, a second circuit board 128, and other components may be mounted to the rear case 112 of the second part 120 (FIG. 1). The camera module 124b forms part of third image input unit 124 (FIG. 1), and may be provided with through holes.

One or more switches 122a are mounted to the second circuit board 128 in correspondence to manipulation pads 122b positioned on the second part 120. As the manipulation pads 122b are pressed, information is input. The switches 122a and the manipulation pads 122b may form the projection manipulation unit 122 (FIG. 1).

The optical source device 121a for emitting light may be mounted in the second part 120. The optical source device 121a may be implemented as an LED, a laser emitting device, or other component known in the art for use as an optical source device. The projection unit 121 may include one optical source device 121a or multiple optical source devices 121a.

An image forming module 121b is arranged so as to be positioned adjacent to the optical source device 121a. The image forming module 121b forms the second image information 402 by using light emitted from the optical source device 121a.

The image forming module 121b may operate in the same manner as a module for implementing image information by a digital light processing (DLP) projector. In this manner, light emitted from the optical source device 121a is sequentially separated into red, green, and blue. The separated three colors go through a digital micro-mirror device (DMD) to implement image information. A non-color separation method using three optical source devices 121a for emitting R, G and B colors may also be utilized. The image information implementing method is not limited to the above methods, but may include various methods such as a line scan method, or other methods known in the art.

A lens 121c is disposed adjacent to the image forming module 121b. The lens 121c projects the enlarged second image information 402. The optical source device 121a, the image forming module 121b, and the lens 121c may constitute the projection unit 121 (FIG. 1), and may be formed in a unitary module.

The lens 121c is arranged to align with projection holes 121d. The projection holes 121d are formed at the second part 120, and allow the second image information 402 to pass therethrough. The projection holes 121d may be formed as semi-circular grooves formed at the front case 111 and the rear case 112. When the front case 111 and the rear case 112 are coupled to each other, the semi-circular grooves are positioned adjacent each other, thereby forming the projection holes 121d. The projection holes 121d of the front case 111 are formed on another surface of the terminal body 100a intersecting with one surface of the terminal body 100a where the window 113a is disposed. The projection holes 121d may alternatively be formed on a side surface of the second part 120. The projection holes 121d are disposed at the second part 120, and may be covered by the cover 130 (FIG. 1) when the projection unit 121 is not in use, thereby preventing foreign materials from being introduced into the terminal body 100a when the projection unit 121 is not in use.

The front cover 131 and the rear cover 132 are movably mounted to the front case 111 and the rear case 112, respectively. The cover 130 is formed by the front cover 131 and the rear cover 132 being coupled to each other.

A third circuit board 138 may be mounted to the rear cover 132. A microphone 134b for inputting audio may be mounted to the third circuit board 138. One or more switches 133a may be mounted to the third circuit board 138 to correspond and align with manipulation pads 133b, thereby forming the first user input unit 133 (FIG. 1).

Figure 4:
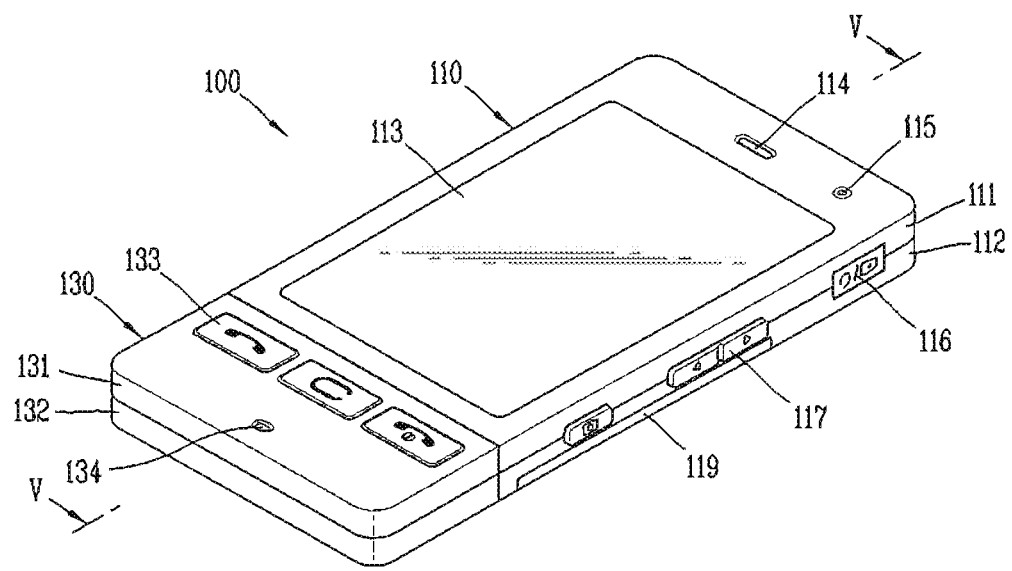
FIG. 4 is a perspective view of the portable terminal of FIG. 1 in a closed state.
Figure 5:
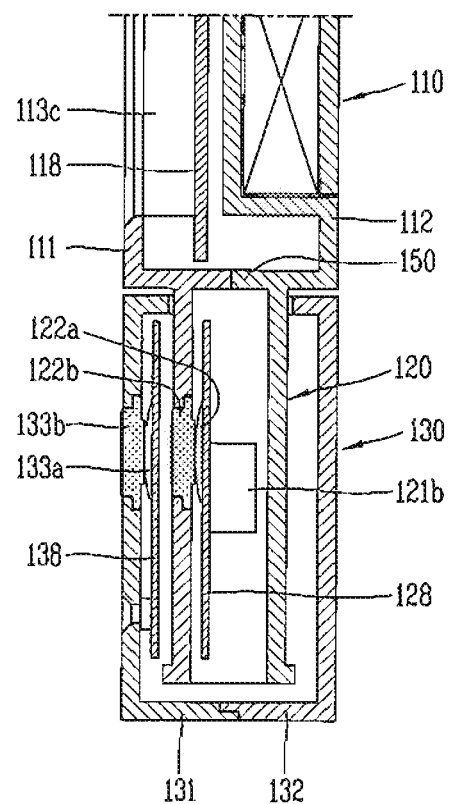
FIG. 5 is a sectional view taken along line 'V-V' in FIG. 4.

Referring to FIGS. 4 and 5, when the second part 120 is in a closed configuration, the first part 110 and the cover 130 come in contact with each other on the same plane. In this manner, the second part 120 is not exposed to the outside, and operations of the portable terminal 100, such as voice calls, may be executed.

The inside of each of the first and second parts 110 and 120 is shielded from each other by a shielding plate 150. The shielding plate 150 may be made of protrusions extending from each of the front case 111 and the rear case 112, toward the inside of the portable terminal 100. In this manner, electronic devices arranged in the first part 110 are not electromagnetically or thermally influenced by electronic devices arranged in the second part 120.

The cover 130 forms a recess having an opening on one surface thereof. The cover 130 may accommodate the second part 120 through the opening in a first state by a sliding motion.

Figure 6:
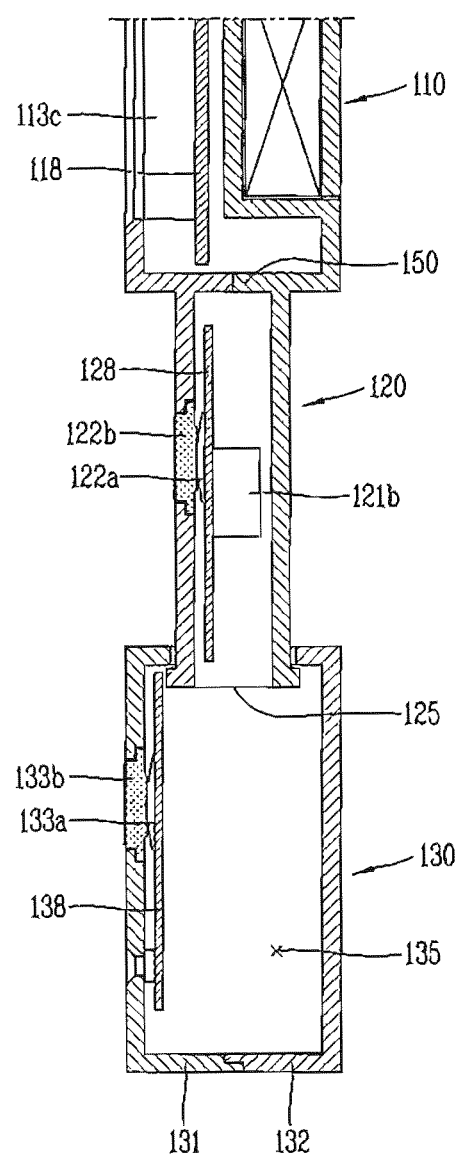
FIG. 6 is a sectional view of the portable terminal of FIG. 1 in the open state.

Referring to FIG. 6, the cover 130 is in a second state to form an empty space 135, which is different from the first state. An end 125 of the second part 120, on an end opposite to which the first part 110 is coupled, is formed to communicate with the empty space 135.

The interior of the second part 120 communicates with the empty space 135 and the ventilation holes 123 (FIG. 2) positioned in the second part 120. In this manner, pressure in the empty space 135 is lower than an external pressure when the empty space 135 is formed through the sliding motion of the cover 130 in a direction away from the first part 110. As a result, external air is introduced into the empty space 135 through the ventilation holes 123. The introduced external air serves to lower a temperature of peripheral air of the optical source device 121a (FIG. 3) more than when the empty space 135 is not formed. Also, the introduced external air causes air flow around the optical source device 121a, which accelerates heat transfer between the air and the optical source device 121a. This enhances optical performance of the optical source device 121a. Generally, a heat emitting body disposed in a small area has a temperature increase rate that is greater than that of a heat emitting body disposed in a large area. Accordingly, the empty space 135 lowers the temperature increase rate of the optical source device 121a due to heat emission.

Figure 7:
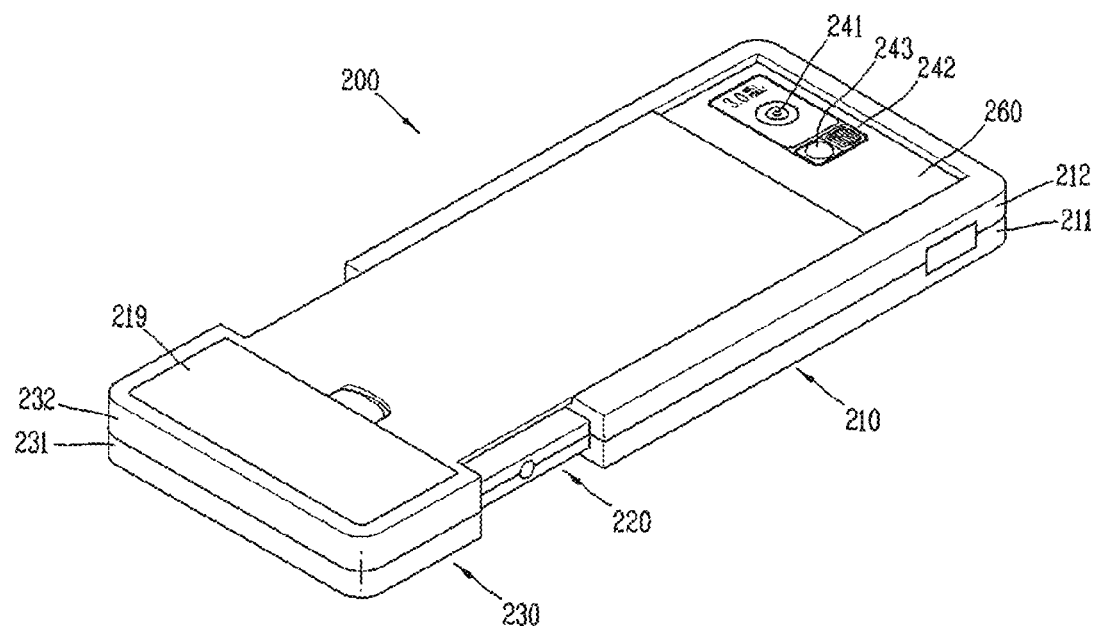
FIG. 7 is a perspective view of a portable terminal according to another embodiment of the present invention.

Referring to FIG. 7, a recessed, stepped-down portion 260 is positioned on a rear surface of a rear case 212 of a first part 210. A second image input unit 241 may be mounted to the recessed portion 260. The cover 230 extends such that a part, or all, thereof can cover the second image input unit 241. A part extending from the cover 230 extends to the recessed portion 260, and a power supply unit 219 is positioned at the cover 230. Alternatively, the cover 230 may extend to cover the second image input unit 241 without the recessed portion 260, and the power supply unit 219 may be positioned at the first part 210.

The second image input unit 241 is positioned to be opened and closed by motion of the cover 230. Accordingly, the second image input unit 241 and the projection unit 121 may be configured so as to be simultaneously used or not used.

Figure 8:
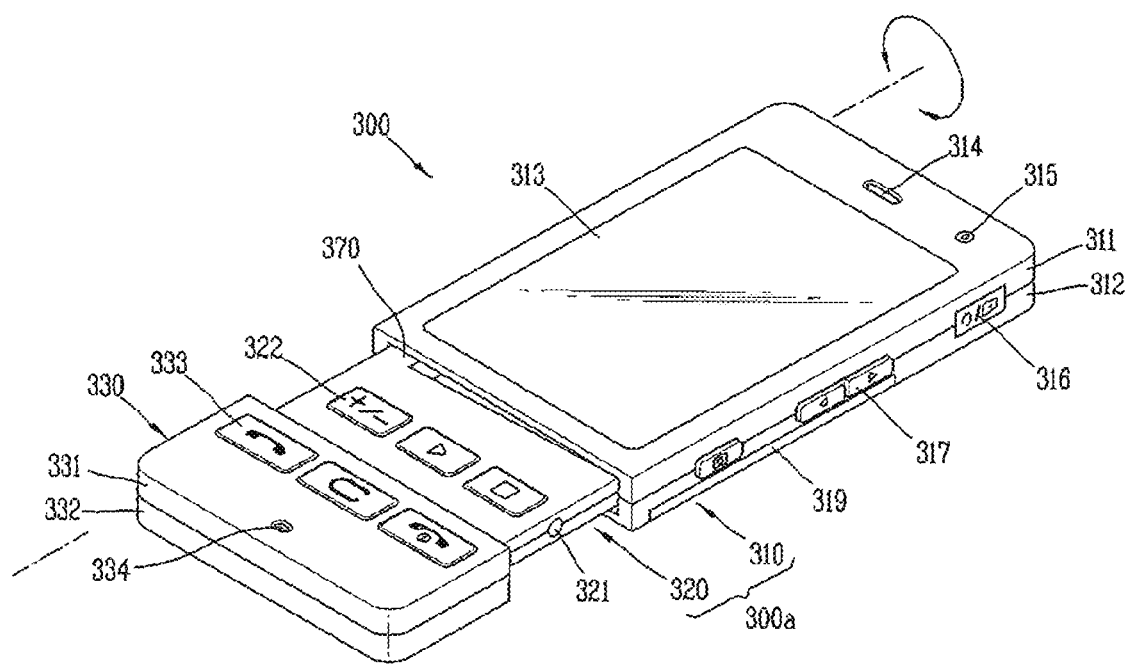
FIG. 8 is a perspective view of a portable terminal according to still another embodiment of the present invention.

Referring to FIG. 8, a second part 320 is formed so as to perform a relative motion with respect to a first part 310. One side of the second part 320 is hinge-coupled to the first part 310 by a hinge coupling unit 370. The second part 320 rotates with respect to the first part 310 based on the hinge coupling unit 370. The portable terminal 300 is disposed in a state that the first part 310 comes into contact with another object. Here, a projection direction of the projection unit 321 may be controlled by rotation of the second part 320. The second part 320 is rotated around a shaft depicted in FIG. 8. The shaft is oriented in a longitudinal direction of the portable terminal 300, and is positioned toward one side in a width direction. This allows the second part 320 to be rotated in a state that the first part 310 comes in contact with another object.

FIGS. 9 to 13 depict portable terminals 400 to 800 in use. The first image information 401 (FIG. 9) is displayed on the display unit 113. The projection unit 121 (FIG. 1) outwardly projects second image information 402, 502, 702 and 802.

Figure 9:
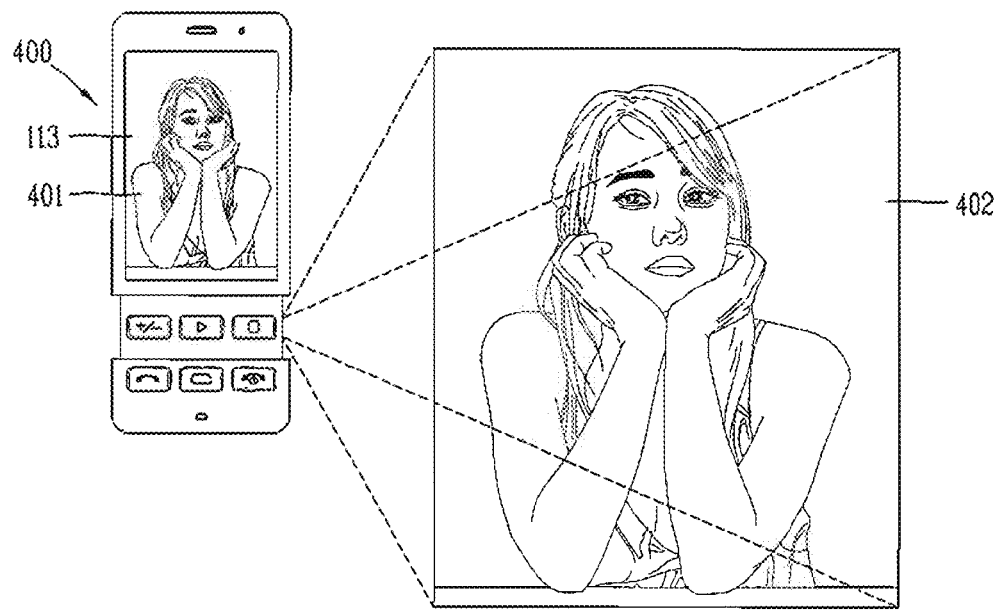
FIGS. 9 to 13 are operational views of the portable terminal according to various embodiments of the present invention.
Figure 10:
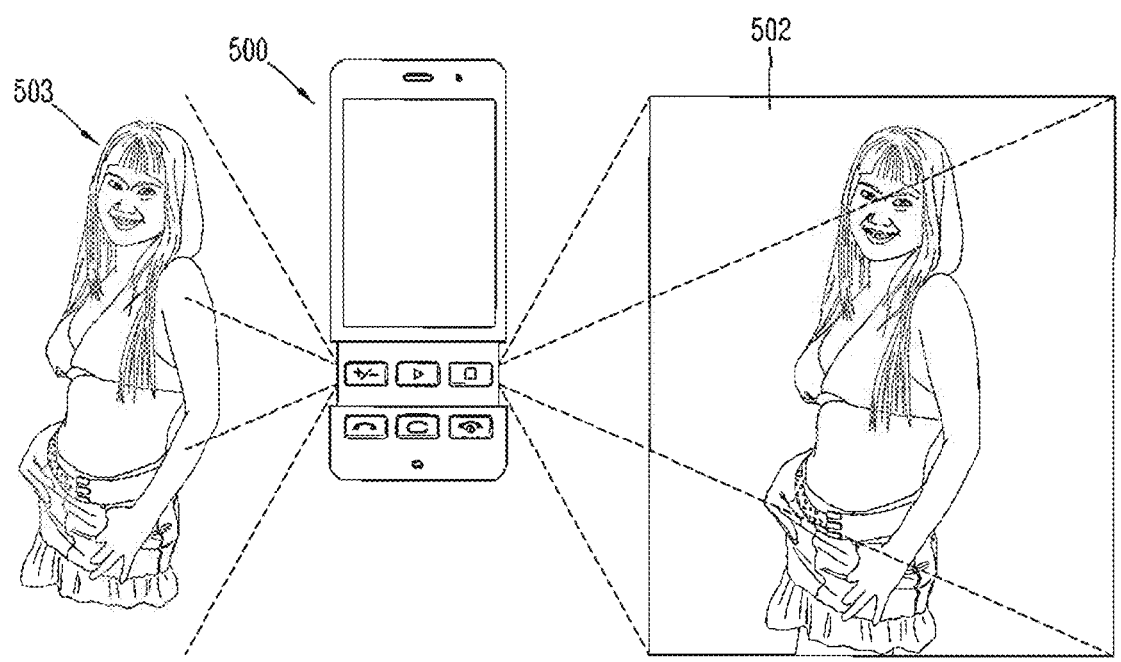
Figure 11:
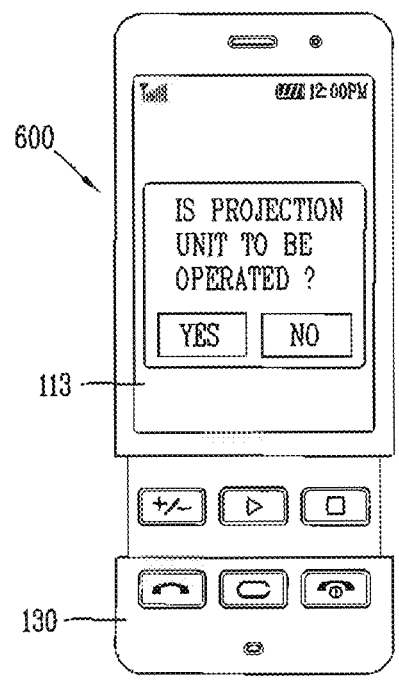
Figure 12:
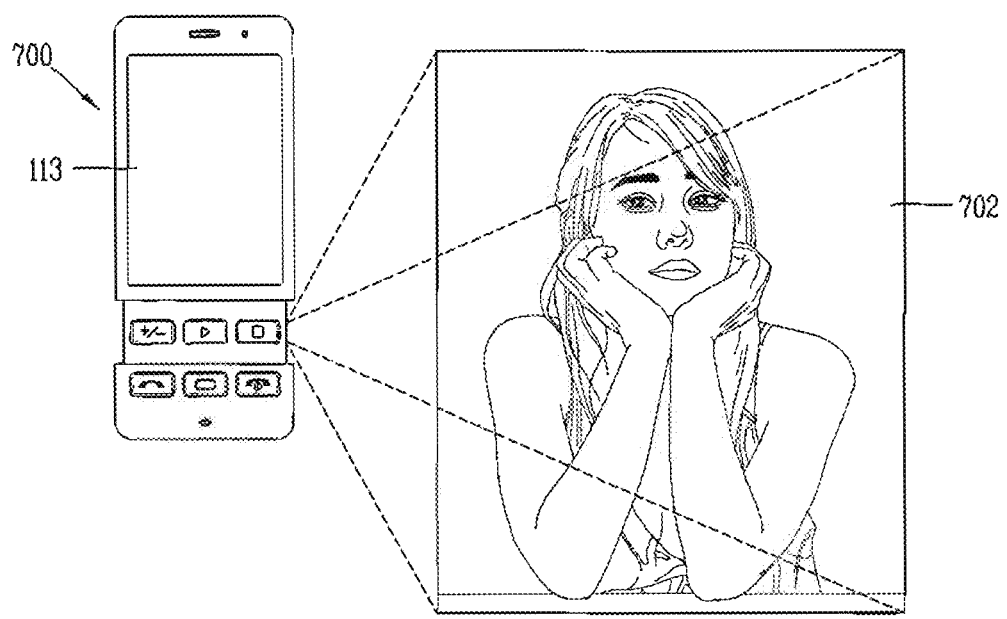

Referring to FIG. 9, the first and second image information 401 and 402 may be implemented as the same image information. Referring to FIG. 10, the second image information 502 may be implemented as external image information 503 input through the third image input unit 124 (FIG. 2). Referring to FIG. 11, the display unit 113 displays a menu for selecting a projection operation of the projection unit 121. The menu is displayed on the display unit 113 when the cover 130 (FIG. 1) is moved away from the first part 110 so that the second part 120 can be opened, or exposed. The menu may be displayed for about 2~5 seconds, and may then disappear when no item on the menu is selected by a user. Referring to FIG. 12, the display unit 113 is configured to reduce power consumption by being deactivated when the projection unit 121 performs a projection operation. This feature may be implemented through a user's selection.

Figure 13:
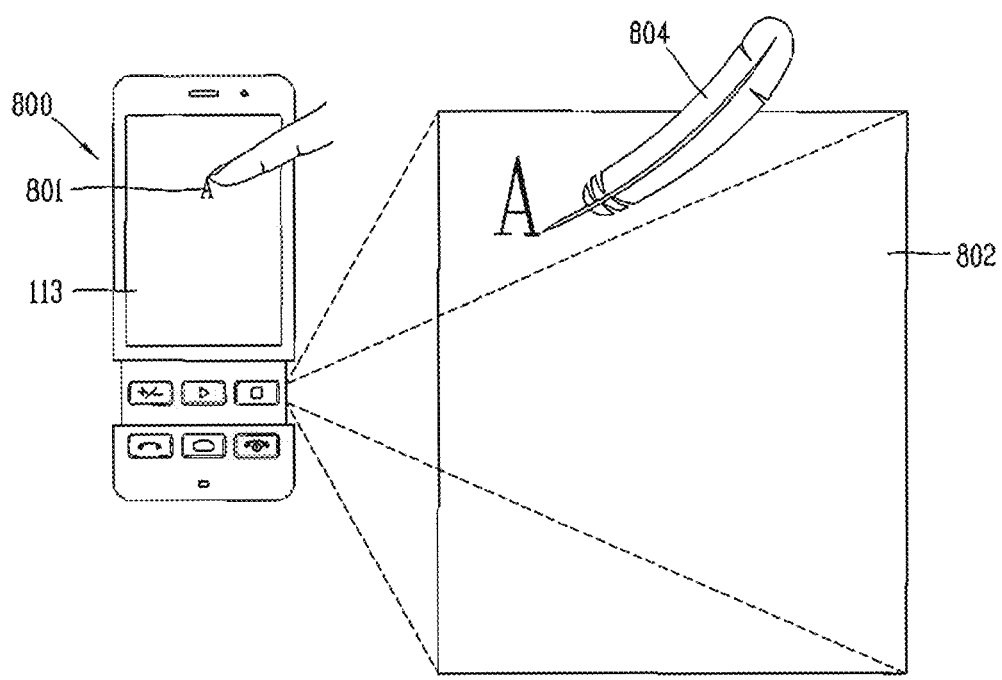

Referring to FIG. 13, the display unit 113 may be implemented as a touch screen for touch input, and the second image information 802 may further include information 804 indicating a touch point on the display unit 113. In FIG. 13, an end of a feather-shaped icon is implemented as the information 804 indicating a touch point on the display unit 113. For instance, a controller 180 having sensed touch of the display unit 113 may control output of the second image information 802 so that a pre-stored icon can be displayed on a user's touch point.

Figure 14:
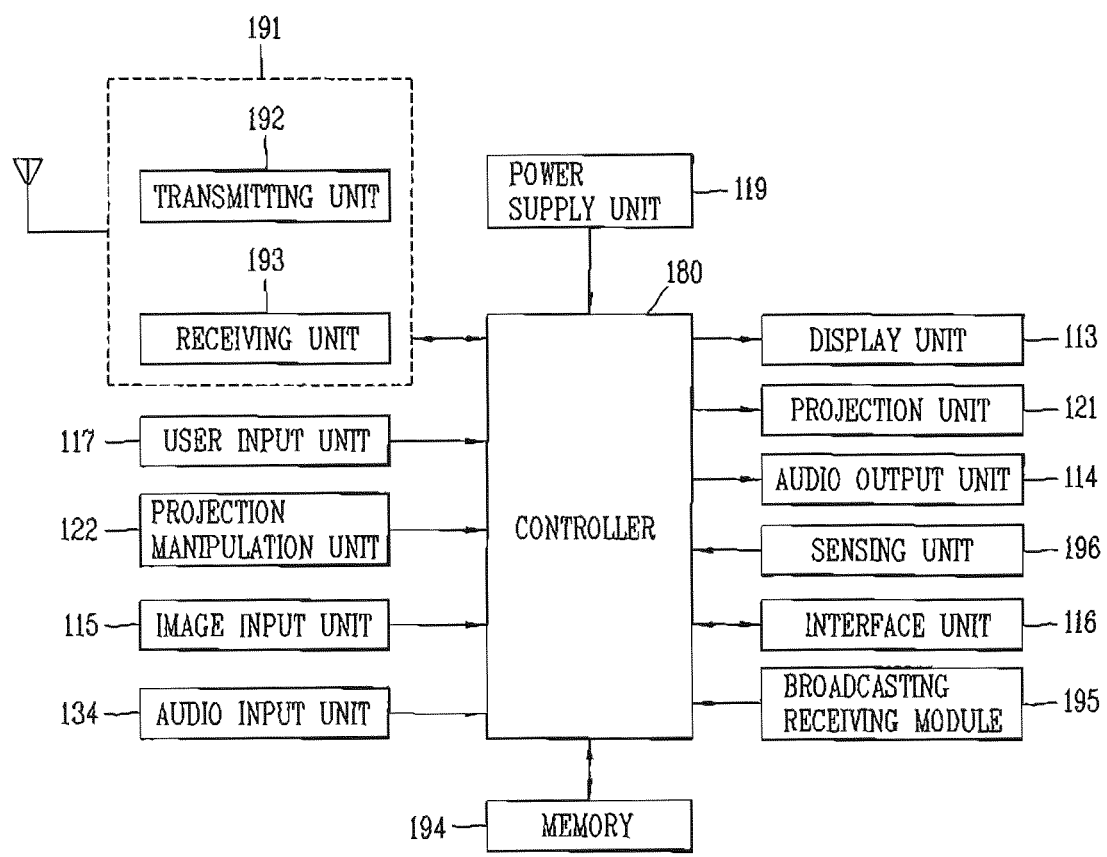
FIG. 14 is a block diagram of the portable terminal according to various embodiments of the present invention.

Referring to FIG. 14, a portable terminal includes a wireless communications module 191, a user input unit 117, a projection manipulation unit 122, image input unit 115 an audio input unit 134, a broadcasting receiving module 195, a memory 194, a power supply unit 119, and a controller 180. User input unit 133 may be configured in a manner similar to user input unit 117, and image input units 124 and 141 may each be configured in a manner similar to image input unit 115.

The controller 180 typically controls the overall operations of the portable terminal. For instance, the controller 180 performs the control and processing associated with voice calls, data communications, and video calls.

The wireless communications module 191 transmits or receives wireless signals to/from a base station through an antenna. For instance, the wireless communications module 191 transmits or receives voice data, text data, video data, and control data under control of the controller 180. The wireless communications module 191 includes a transmitting portion 192 for transmitting a signal through a modulation process, and a receiving unit 193 for demodulating a received signal.

As shown in FIG. 1, the user input unit 117 and 133 provides, to the controller 180, key input data input by a user for controlling the operation of the portable terminal. The user input units 117 and 133 are implemented as a dome switch, a touch pad, a jog wheel, a jog switch, or other input devices known in the art.

As shown in FIG. 1, the projection manipulation unit 122 provides, to the controller 180, key input data input by a user for controlling the operation of the projection unit 121. The projection manipulation unit 122 is implemented as a dome switch, a touch pad, a jog wheel, a jog switch, or other manipulation devices known in the art.

The image input units 115, 124 and 141 process image frames of still images or moving images captured by an image sensor in a video call mode or a capturing mode. Then, the processed image frames are converted into image data that can be displayed on the display unit 113, and then are output to the display unit 113.

Under control of the controller 180, the image frames processed by the image input units 115, 124 and 141 may be stored in the memory 194, or may be outwardly transmitted through the wireless communications module 191.

The audio input unit 134 receives external audio signals by a microphone in a call mode, or a recording mode, or a voice recognition mode, or other modes that require receiving audio input, and then processes the received audio signals into electric voice data. In the case of a call mode, the processed voice data is converted into data that can be transmitted to the base station through the wireless communications module 191, and then is output to the wireless communications module 191. In the case of a recording mode, the processed voice data is output so as to be stored in the memory 194. The audio input unit 134 may include assorted noise removing algorithms to remove noise generated in the course of receiving an external audio signal.

The display unit 113 may display information processed in the portable terminal. For example, when the portable terminal is in a call mode, User Interface (UI) or Graphic User Interface (GUI) relating to a call is displayed under control of the controller 180. When the portable terminal is in a video call mode or a capturing mode, a captured image, UI or GUI is displayed under control of the controller 180. When the display unit 113 includes a touch screen, it serves as an input device as well as an output device.

The projection unit 121 outwardly projects image information processed in the portable terminal. For example, the projection unit 121 outwardly projects information displayed on the display unit 113 under control of the controller 180.

In various modes, including a call-receiving mode, a call-placing mode, a recording mode, a voice recognition mode and a broadcast reception mode, the first audio output unit 114 converts audio data received from the wireless communications module 191, or audio data stored in the memory 194, to thereby outwardly output under control of the controller 180. The first audio output unit 114 outputs audio signals relating to functions executed in the portable terminal (e.g., call signal receiving sound, message receiving sound, or other function of the portable terminal). The first audio output unit 114 includes a speaker, a receiver, a buzzer, or other audio outputting component known in the art.

A sensing unit 196 senses the current status of the portable terminal such as an open/close status of the portable terminal, an orientation of the portable terminal, and presence or absence of a user's contact with the portable terminal, thereby generating sensing signals to control the operation of the portable terminal. For example, when the portable terminal 1 is a slide-type portable terminal, the sensing unit 196 may sense whether a sliding portion of the portable terminal is opened or closed. Then, the sensing unit 196 outputs results of the sensing to the controller 180, and thereby the operation of the portable terminal is controlled. Other examples include the sensing unit 196 sensing the presence or absence of power provided by the power supply unit 119, the presence or absence of coupling or other connection between the interface unit 116 and an external device, and so on.

The interface unit 116 interfaces a wire/wireless headset, an external charger, a wire/wireless data port, and a card socket (e.g., memory card, SIM/UIM card) rather than the portable terminal, with all types of external devices connected to the portable terminal. The interface unit 116 receives data or power from an external device, and transmits it to each component inside the portable terminal. Otherwise, the interface unit 116 transmits data inside the portable terminal to an external device.

The memory 194 may store a program to activate the controller 180, or may temporarily store input/output data (e.g., phonebook, messages, still images, moving images, and so on). Furthermore, the memory 194 stores programs to control the operation of the portable terminal. The memory 194 includes the concepts of the general hard disc, card-type memory (e.g., SD or XD memory), flash memory, RAM, ROM, and so on.

The broadcasting receiving module 195 receives a broadcasting signal transmitted through satellite or terrestrial waves, etc., and converts the signal into broadcasting data that can be output to the first audio output unit 114, the display unit 113, and the projection unit 121, thereby to output it to the controller 180. The broadcasting receiving module 195 also receives broadcasting-related data (e.g., Electric Program Guide: EPG, channel list, etc.). Broadcasting data and additional data converted by the broadcasting receiving module 195 may be stored in the memory 194.

The power supply unit 119 receives external or internal power under control of the controller 180, and supplies the power to each component of the portable terminal.

The portable terminal can be configured to project image information to a large screen through the projection unit. As the projection unit and the image input unit are interworked, a user can project a received external image to a large screen.

Furthermore, a part in which the projection unit is disposed can be selectively opened and closed via the cover. In this manner, foreign materials are prevented from being introduced into the terminal body when the projection unit is not in use.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A terminal, comprising:
a display unit configured to be touch sensitive;
a body comprising a front side, a rear side, a left side, and a right side, wherein the body is sized to receive the display unit, the display unit being positioned to be viewable from the front side of the body;
a projector being operable to project an image on an external surface;
a wireless communications module configured to transmit or receive wireless signals for voice calls or data communications;
a controller configured to control the display unit and the projector, the controller being operable to output information indicating a touch point to the image projected by the projector when the touch point is sensed from the display unit in a state where both of the display unit and the projector are activated; and
a projector mounting portion located at an end of the body, the projector mounting portion comprising a front side, a rear side, a left side, and a right side;
a housing sized to define a cavity to slidably receive the projector mounting portion, wherein the housing is positionable between open and closed positions by providing relative linear motion between the housing and the body, wherein the open position relates to increasing the relative distance between the housing and the display unit, and the closed position relates to decreasing the relative distance between the housing and the display unit,
wherein the projector is located within the projector mounting portion, and when the housing is at least partially positioned in the open position, the projector is located to project the image from one of the left or right sides of the projector mounting portion.

2. The terminal according to claim 1, further comprising:
a first input region positioned on the front side of the projector mounting portion, wherein the first input region comprises at least one input element configured to permit control of one or more functions associated with the projector responsive to user input; and
a second input region positioned on a front side of the housing, wherein the second input region comprises at least one input element configured to permit control of one or more functions of the terminal.

3. The terminal according to claim 1, further comprising:
an image input unit positioned on the front side of the body and configured to capture an image regardless of whether the housing is in the open position or the closed position.

4. The terminal according to claim 1, wherein the rear side of the body is structured to define a recessed region, the terminal further comprising:
an extended element which extends from the rear side of the housing, the extended element being sized to be slidably received by the recessed region of the rear side of the body; and
an image input unit positioned on the recessed portion of the rear side of the body and configured to operate to capture an image, wherein the closed position of the housing permits the extended element to cover the image input unit and the open position of the housing permits the extended element to expose the image input unit to allow the image input unit to capture the image.

5. The terminal according to claim 1, further comprising:
an image input unit positioned within the projector mounting portion and configured to capture an image when the housing is in the open position.

6. The terminal according claim 5, wherein:
the image input unit is located to capture images in a first direction from one of the left or right sides of the projector mounting portion; and
the image projected by the projector is in a second direction which is substantially opposite to the first direction.

7. The terminal according to claim 5, wherein the image projected by the projector is a near real-time image obtained from the image input unit.

8. The terminal according claim 5, wherein the image input unit is protectively covered by the housing when the housing is in the closed position.

9. The terminal according to claim 1, wherein the front side, the rear side, the left side, and the right side of the body generally correspond to the front side, the rear side, the left side, and the right side of the projector mounting portion.

10. The terminal according claim 1, wherein:
the body comprises a first width along the front and rear sides and a first height along the left and right sides;
the projector mounting portion comprises a second width along the front and rear sides and a second height along the left and right sides; and
the second width is smaller than the first width and the second height is smaller than the first height.

11. The terminal according claim 1, wherein the projector is protectively covered by the housing when the housing is in the closed position.

12. The terminal according to claim 1, wherein the projector mounting portion is fixedly coupled to the end of the body.

13. The terminal according to claim 1, wherein the projector mounting portion is rotatably coupled to the body to permit relative rotational movement between the body and the projector mounting portion.

14. The terminal according claim 1, wherein the display unit is configured to display a user selectable menu relating to operation of the projector responsive to the housing being positioned in the open position.

15. The terminal according to claim 1, wherein the display unit is inactivated during operation of the projector.

16. The terminal according to claim 1, wherein the information indicating the touch point is a pre-stored image disposed on the image projected by the projector.

17. The terminal according claim 16, wherein the pre-stored image is not displayed on the display unit even though the pre-stored image is outputted to the image projected by the projector.

18. The terminal according claim 17, wherein the same image that the projector projects is displayed on the display unit.

19. A terminal, comprising:
a display unit configured to be touch sensitive;
a body comprising a front side, a rear side, a left side, and a right side, wherein the body is sized to receive the display unit, the display unit being positioned to be viewable from the front side of the body;
a camera located on the front side of the body so as to having a capturing direction orthogonal to the front side of the body;
a projector mounting portion fixedly coupled to the body, the projector mounting portion comprising a front side, a rear side, a left side, and a right side;
a projector located within the projector mounting portion and being operable to project an image toward a direction different from the capturing direction;
a housing sized to define a cavity to slidably receive the projector mounting portion, wherein the housing is positionable between open and closed positions by providing relative linear motion between the housing and the body, wherein the open position relates to increasing the relative distance between the housing and the display unit, and the closed position relates to decreasing the relative distance between the housing and the display unit, wherein when the housing is at least partially positioned in the open position, the projector is located to project the image from one of the left or right sides of the projector mounting portion; and
a controller configured to control the display unit and the projector such that the same image as the projector projects is displayed on the display unit, the controller being operable to output an indicator indicating a touch point sensed from the display unit to the image projected by the projector.

20. The terminal according claim 19, wherein the indicator is not displayed on the display unit even though the indicator is outputted to the image projected by the projector.

21. A terminal, comprising:
a display unit configured to be touch sensitive;
a body comprising a front side, a rear side, a left side, and a right side, wherein the body is sized to receive the display unit, the display unit being positioned to be viewable from the front side of the body;
a projector being operable to project an image on an external surface;
a wireless communications module configured to transmit or receive wireless signals for voice calls or data communications;
a controller configured to control the display unit and the projector, the controller being operable to output information indicating a touch point to the image projected by the projector when the touch point is sensed from the display unit in a state where both of the display unit and the projector are activated;
a projector mounting portion located at an end of the body, the projector mounting portion comprising a front side, a rear side, a left side, and a right side; and
a housing sized to define a cavity to slidably receive the projector mounting portion, wherein the housing is positionable between open and closed positions by providing relative linear motion between the housing and the body, wherein the open position relates to increasing the relative distance between the housing and the display unit, and the closed position relates to decreasing the relative distance between the housing and the display unit.

* * * * *